United States Patent
Yoakum et al.

(10) Patent No.: US 8,547,880 B2
(45) Date of Patent: Oct. 1, 2013

(54) METHOD AND SYSTEM FOR REPLAYING A PORTION OF A MULTI-PARTY AUDIO INTERACTION

(75) Inventors: John H. Yoakum, Cary, NC (US); John Costello, Galway (IE); Tony McCormack, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 916 days.

(21) Appl. No.: 12/569,931

(22) Filed: Sep. 30, 2009

(65) Prior Publication Data

US 2011/0077755 A1    Mar. 31, 2011

(51) Int. Cl.
*H04L 12/16*    (2006.01)

(52) U.S. Cl.
USPC ............ 370/260; 370/265; 370/266

(58) Field of Classification Search
None
See application file for complete search history.

(56) References Cited

U.S. PATENT DOCUMENTS

| | | | |
|---|---|---|---|
| 4,650,929 A | 3/1987 | Boerger et al. |
| 4,734,934 A | 3/1988 | Boggs et al. |
| 5,020,098 A | 5/1991 | Celli |
| 5,113,431 A | 5/1992 | Horn |
| 5,533,112 A | 7/1996 | Danneels |
| 5,539,741 A | 7/1996 | Barraclough et al. |
| 5,790,635 A | 8/1998 | Dezonno |
| 5,889,843 A | 3/1999 | Singer et al. |
| 6,011,851 A | 1/2000 | Connor et al. |
| 6,125,115 A | 9/2000 | Smits |
| 6,178,237 B1 | 1/2001 | Horn |
| 6,219,045 B1 | 4/2001 | Leahy et al. |
| 6,241,612 B1 | 6/2001 | Heredia |
| 6,327,567 B1 | 12/2001 | Willehadson et al. |
| 6,330,022 B1 | 12/2001 | Seligmann |
| 6,408,327 B1 | 6/2002 | McClennon et al. |
| 6,501,739 B1 | 12/2002 | Cohen |
| 6,539,087 B1 | 3/2003 | Walsh et al. |
| 6,559,863 B1 | 5/2003 | Megiddo |
| 6,657,975 B1 | 12/2003 | Baxley et al. |

(Continued)

FOREIGN PATENT DOCUMENTS

| EP | 0762717 A2 | 3/1997 |
|---|---|---|
| EP | 1954019 A1 | 8/2008 |

(Continued)

OTHER PUBLICATIONS

Benford, S., et al., "Managing Mutual Awareness in Collaborative Virtual Environments," Proceedings VRST '94, Aug. 1994, ACM Press, Singapore, 14 pages.

(Continued)

*Primary Examiner* — Ayaz Sheikh
*Assistant Examiner* — Faiyazkhan Ghafoerkhan
(74) *Attorney, Agent, or Firm* — Withrow & Terranova, PLLC (57) ABSTRACT

A method for replaying a portion of a multi-party audio interaction to a participant of the audio interaction. A participant of a multi-party audio interaction, such as a conference call or a gaming session, can request a replay of a portion of the audio interaction. A conference processor can provide an outgoing audio stream to the participant that includes a replay audio stream that includes the requested replayed portion of the multi-party audio interaction and a real-time audio stream that includes the ongoing multi-party audio interaction. The replay audio stream can be aurally positioned at an aural position that is different from the real-time audio stream to enhance the participant's ability to distinguish between the two audio streams.

22 Claims, 5 Drawing Sheets

(56) References Cited

U.S. PATENT DOCUMENTS

| | | | |
|---|---|---|---|
| 6,675,054 | B1 | 1/2004 | Ruberg |
| 6,807,563 | B1 | 10/2004 | Christofferson et al. |
| 6,813,360 | B2 | 11/2004 | Gentle |
| 6,839,417 | B2 | 1/2005 | Weisman et al. |
| 6,850,496 | B1* | 2/2005 | Knappe et al. ............... 370/260 |
| 6,879,565 | B2 | 4/2005 | Baxley et al. |
| 6,959,075 | B2* | 10/2005 | Cutaia et al. ............ 379/202.01 |
| 6,985,571 | B2 | 1/2006 | O'Malley et al. |
| 7,006,616 | B1 | 2/2006 | Christofferson et al. |
| 7,111,049 | B1 | 9/2006 | Granger et al. |
| 7,180,997 | B2 | 2/2007 | Knappe |
| 7,181,690 | B1 | 2/2007 | Leahy et al. |
| 7,194,084 | B2 | 3/2007 | Shaffer et al. |
| 7,412,392 | B1 | 8/2008 | Satapathy |
| 7,418,090 | B2* | 8/2008 | Reding et al. ............ 379/202.01 |
| 7,466,334 | B1* | 12/2008 | Baba ......................... 348/14.06 |
| 7,908,320 | B2 | 3/2011 | Ludwig et al. |
| 7,933,226 | B2 | 4/2011 | Woodruff et al. |
| 7,995,732 | B2 | 8/2011 | Koch et al. |
| 8,005,023 | B2* | 8/2011 | Li et al. .......................... 370/260 |
| 2002/0013813 | A1 | 1/2002 | Matsuoka |
| 2002/0020951 | A1 | 2/2002 | Choi |
| 2002/0181721 | A1 | 12/2002 | Sugiyama et al. |
| 2003/0021400 | A1 | 1/2003 | Grandgent et al. |
| 2003/0112947 | A1 | 6/2003 | Cohen |
| 2003/0117531 | A1 | 6/2003 | Rovner et al. |
| 2003/0174657 | A1 | 9/2003 | Qin |
| 2003/0234859 | A1 | 12/2003 | Malzbender et al. |
| 2004/0047461 | A1 | 3/2004 | Weisman et al. |
| 2004/0052218 | A1* | 3/2004 | Knappe ......................... 370/260 |
| 2004/0101120 | A1 | 5/2004 | O'Malley et al. |
| 2004/0113252 | A1 | 6/2004 | Vonstaudt |
| 2004/0190700 | A1* | 9/2004 | Cutaia et al. ............ 379/202.01 |
| 2004/0240652 | A1 | 12/2004 | Kanada |
| 2005/0053214 | A1* | 3/2005 | Reding et al. ............ 379/202.01 |
| 2005/0062843 | A1 | 3/2005 | Bowers et al. |
| 2005/0181872 | A1 | 8/2005 | Acharya et al. |
| 2005/0271194 | A1* | 12/2005 | Woods et al. ............ 379/202.01 |
| 2005/0280701 | A1 | 12/2005 | Wardell |
| 2006/0067500 | A1 | 3/2006 | Christofferson et al. |
| 2006/0104458 | A1 | 5/2006 | Kenoyer et al. |
| 2007/0071204 | A1 | 3/2007 | Kanada |
| 2007/0133436 | A1 | 6/2007 | Provino et al. |
| 2007/0279484 | A1 | 12/2007 | Derocher et al. |
| 2008/0037749 | A1 | 2/2008 | Metzger et al. |
| 2008/0144794 | A1 | 6/2008 | Gardner |
| 2008/0144876 | A1 | 6/2008 | Reining et al. |
| 2008/0260131 | A1 | 10/2008 | Akesson |
| 2009/0086949 | A1 | 4/2009 | Caspi et al. |
| 2009/0220064 | A1 | 9/2009 | Gorti et al. |
| 2010/0020951 | A1 | 1/2010 | Basart et al. |
| 2010/0073454 | A1 | 3/2010 | Lovhaugen et al. |
| 2010/0158203 | A1* | 6/2010 | Mikan et al. .................... 379/68 |

FOREIGN PATENT DOCUMENTS

| | | | |
|---|---|---|---|
| GB | 2303516 | A | 2/1997 |
| WO | 9941880 | A1 | 8/1999 |
| WO | 0048379 | A1 | 8/2000 |
| WO | WO 2004095822 | A1 * | 11/2004 |
| WO | 2010046736 | A1 | 4/2010 |
| WO | 2011036543 | A1 | 3/2011 |

OTHER PUBLICATIONS

Damer, B., "Avatars!: Exploring and Building Virtual Worlds on the Internet (excerpts)", Peachpit Press, Berkeley, 1998, 158 pages.

No Author, "Digital Space Traveler User Guide," The Digital Space Commons, Chapters 1-8, http://www.digitalspace.com/traveler/DigitalSpaceTravelerUserGuide.pdf, 46 pages.

McCarthy, S., "PC users step through their screens via OnLive!," Telephony Online, Sep. 9, 1996, accessed May 27, 2007, http://telephonyonline.com/mag/telecom_pc_users_step/, 2 pages.

No Author, "OnLive! Products," OnLive! Technologies, Inc., accessed May 22, 2007, http://web.archive.org/web/19970714193742/http://www.onlive.com/prod/, 3 pages.

Liesenborgs, J., "Voice over IP in networked virtual environments," Maastricht University Doctoral Thesis, 1999-2000 Academic Year, Title Page, Table of Contents and Chapters 6 and 10, 18 pages.

Eubank, W., "Summer Internet World '97, McCormick Place, Chicago, Illinois, Jul. 21-25, 1997", Aug. 1, 1996, updated Aug. 1, 1997, http://www.eubank-web.com/William/Articles/world97.htm, 5 pages.

No Author, "3D Conferencing White Paper," DiamondWare, May 19, 2005, 7 pages.

No Author, "3D Audio through the Internet," DiamondWare, May 15, 2005, 7 pages.

No Author, "Out With the Old, in With Palantir," DiamondWare, Sep. 28, 2003, 2 pages.

International Search Report for PCT/IB2010/002384 mailed Feb. 2, 2011, 10 pages.

Search Report for United Kingdom Patent Application No. 1119805.8 issued Mar. 14, 2012, 2 pages.

Notice of Allowance for U.S. Appl. No. 12/564,262 mailed Nov. 25, 2011, 10 pages.

Non-final Office Action for U.S. Appl. No. 12/564,262 mailed Aug. 16, 2011, 7 pages.

Non-final Office Action for U.S. Appl. No. 11/233,773 mailed Oct. 25, 2011, 37 pages.

Advisory Action for U.S. Appl. No. 11/233,773 mailed Aug. 9, 2011, 3 pages.

Final Office Action for U.S. Appl. No. 11/233,773 mailed Jun. 6, 2011, 42 pages.

Non-final Office Action for U.S. Appl. No. 11/233,773 mailed Dec. 28, 2010, 38 pages.

Advisory Action for U.S. Appl. No. 11/233,773 mailed Nov. 9, 2010, 3 pages.

Final Office Action for U.S. Appl. No. 11/233,773 mailed Jun. 22, 2010, 37 pages.

Non-final Office Action for U.S. Appl. No. 11/233,773 mailed Oct. 28, 2009, 38 pages.

Final Office Action for U.S. Appl. No. 11/233,773 mailed May 11, 2009, 34 pages.

Non-final Office Action for U.S. Appl. No. 11/233,773 mailed Sep. 16, 2008, 31 pages.

Final Office Action for U.S. Appl. No. 11/983,616 mailed Apr. 11, 2012, 17 pages.

Non-final Office Action for U.S. Appl. No. 11/983,616 mailed Sep. 28, 2011, 14 pages.

Non-final Office Action for U.S. Appl. No. 12/948,140 mailed Oct. 24, 2012, 18 pages.

Final Office Action for U.S. Appl. No. 11/233,773 mailed Jun. 27, 2012, 49 pages.

Notice of Allowance for U.S. Appl. No. 12/555,413 mailed Aug. 17, 2012, 9 pages.

Non-final Office Action for U.S. Appl. No. 12/887,734 mailed Sep. 4, 2012, 15 pages.

Final Office Action for U.S. Appl. No. 12/887,734 mailed Jan. 3, 2013, 16 pages.

Final Office Action for U.S. Appl. No. 12/948,140 mailed May 7, 2013, 18 pages.

Advisory Action for U.S. Appl. No. 12/948,140 mailed Jul. 11, 2013, 3 pages.

\* cited by examiner

METHOD AND SYSTEM FOR REPLAYING A PORTION OF A MULTI-PARTY AUDIO INTERACTION

FIELD OF THE INVENTION

The present invention relates generally to a multi-party audio interaction, such as a conference call, and in particular to replaying a portion of a multi-party audio interaction to a participant during the multi-party audio interaction.

BACKGROUND OF THE INVENTION

A multi-party audio interaction, such as a conference call, offers a convenient and inexpensive collaboration environment. A conference call minimizes or eliminates travel costs that would be necessary for a face-to-face meeting, and can be arranged and conducted relatively quickly. Consequently, conference calls are prevalent in business and other environments.

It is common for a participant to a conference call to desire to replay a portion of the conference call even while the conference continues. For example, at times a participants' voice may not be clearly audible during a conference call, and replaying what the participant said may be helpful. Frequently a participant to a conference call is interested only in certain topics that may be discussed during the call. While other topics are being discussed, the participant may find it difficult to pay attention to the call, or may even perform other unrelated tasks during the conference call. Consequently, it is not uncommon for a participant to realize only after a conversation has begun that the participant has missed a portion of the discussion about a topic in which they have an interest. Unfortunately, the missed portion of the discussion may have been important for the participant to fully appreciate the context of the discussion. Moreover, it is typically undesirable to interrupt a discussion during a conference to ask for a summarization of a previous portion of the conversation. Consequently, the participant may choose to remain silent, denying the other participants the benefit of any insight the participant may have. Thus, for any variety of reasons, it would be helpful if a participant could easily have a portion of a conference call replayed to the participant while the conference continues. Unfortunately, in a conventional monaural environment, replaying a portion of the conference over the same audio device with which the participant is listening to the conference would result in a confusing, and likely indecipherable, mixture of the replayed portion of the conference and the ongoing portion of the conference.

One solution to this problem would be to mute the ongoing portion of the conference while the replayed portion of the conference is being played, so that the audio signals of the replayed portion do not audibly interfere with the audio signals of the ongoing conference. However, muting the conference would likely exacerbate the problem, as the participant would need to replay the portion of the conference that the participant missed while listening to the replay. Thus, it would be beneficial if a participant could listen, on demand, to a previous portion of a conference while continuing to listen to the ongoing conference.

SUMMARY OF THE INVENTION

The present invention enables a participant of a multi-party audio interaction, such as a conference call, to replay a previous portion of the conference call on an audio playback device while concurrently listening to the ongoing conference call on the same audio playback device. The participants communicate via communication devices, such as, for example, computers. Each communication device establishes a corresponding communication session with a conference processor in a media server. When a participant speaks, the communication device generates an incoming audio stream containing audio signals of the participant's voice and sends the incoming audio stream to the conference processor via the corresponding communication session. The conference processor mixes the audio signals from one or more incoming audio streams to generate outgoing audio streams that comprise real-time audio streams. The conference processor buffers one or more of the incoming audio streams and the outgoing audio streams in a memory. The outgoing audio streams are provided to the communication devices via the corresponding communication sessions. The participants listen to the outgoing audio streams on audio playback devices, such as stereo headsets, that are coupled to the respective communication device.

Each outgoing audio stream may comprise a unique mixture of the audio signals from the incoming audio streams. For example, each outgoing audio stream may include audio signals from the incoming audio streams of all participants except for the audio signals from the incoming audio stream of the participant to which the outgoing audio stream is being provided.

The conference processor receives a replay request from a participant to replay a portion of the conference. The replay request may include a replay length that indicates an amount of time of the conference to replay. Alternately, the conference processor may use a default replay length or the conference processor may access a user defined replay length associated with the participant. The conference processor also obtains aural position data identifying an aural position at which the conference will be replayed. The conference processor is integral with, or otherwise coupled to, a three-dimensional spatial audio engine (3DSAE) that can generate multi-channel outgoing audio signals that are aurally placed at a designated aural position by altering characteristics, such as frequency and phase characteristics, of the audio signals from one or more incoming audio streams. Spatial audio is sound that has been processed to give the listener a sense of the location or position of a sound source. True spatial audio, when presented over a multi-channel audio playback device, such as a stereo headset, appears to come from a particular point in the space outside of the listener's head.

The conference processor extracts a portion of the buffered audio signals from the memory beginning at a start replay location in the memory based on the replay length. The portion of the audio signals extracted from the memory is modified to generate a replay audio stream that is aurally positioned at the designated aural position. The replay audio stream is mixed into the outgoing audio stream that is provided to the participant. The participant listens to the outgoing audio stream on a multi-channel audio playback device, such as a stereo headset. Because the replay audio stream is perceived by the participant to be coming from a designated aural position that is different from the aural position of the real-time audio stream associated with the ongoing conference, the participant can listen to both the replay audio stream and the real-time audio stream concurrently, and relatively easily discriminate between the two audio streams.

The conference processor may also aurally position the audio signals of the ongoing conference to be at a certain aural position that differs significantly from the aural position of the replay audio stream to further separate the concurrent audio streams. The conference processor may also otherwise alter the characteristics of one or both of the replay audio stream and the real-time audio stream by increasing or decreasing a loudness or altering the tonal qualities of one or both of the audio streams.

The conference processor may receive multiple replay requests from different participants during the course of a conference call, and can provide multiple participants different replay audio streams concurrently by maintaining a separate start replay location for each participant. The conference processor can also provide the replay audio streams at different aural positions for each of the participants.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to multi-party audio interactions, such as a contact center interaction involving a customer and one or more support representatives of a company, a gaming session wherein multiple gamers can communicate with one another, a business conference call involving multiple employees, and the like. Embodiments of the invention will be described herein in the context of a business conference call, but the invention may be practiced in any type of multi-party audio interaction wherein multiple parties use communication devices to communicate with one another.

Figure 1:
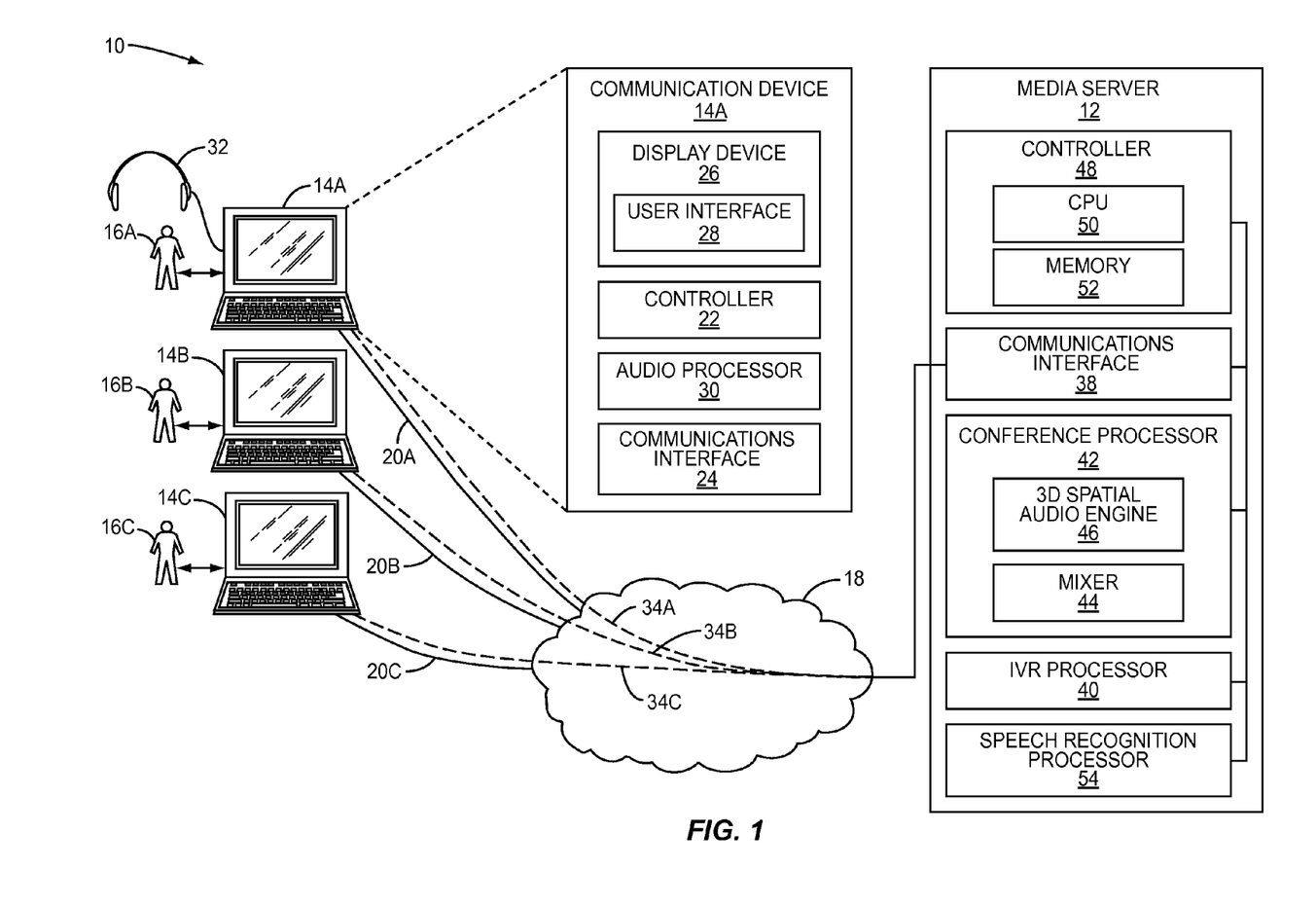
FIG. 1 is a block diagram illustrating a multi-party audio interaction environment, such as conference environment, according to one embodiment of the invention.

FIG. 1 is a block diagram illustrating a multi-party audio interaction environment, such as a conference environment 10, according to one embodiment of the invention. The conference environment 10 includes a media server 12 and a plurality of communication devices 14A-14C. The communication devices 14A-14C may be referred to herein collectively or singularly as the communication devices 14 or the communication device 14, respectively, wherein the discussion relates to any or all of the communication devices 14A-14C. The communications devices 14 may be any device capable of sending and receiving voice signals, and may comprise, for example, a computer, a PDA, a mobile phone such as an Apple® iPhone®, and the like. A plurality of participants 16A-16C use the communication devices 14A-14C to talk with one another in the conference environment 10. The communication devices 14 are communicatively coupled to the media server 12 via a network 18. The communication devices 14A-14C may connect to the network 18 via any suitable network access paths 20A-20C, such as, for example, digital subscriber line technology, cable modem technology, cellular technology, Wi-Fi, Ethernet, Bluetooth, and the like. Data, such as replay requests and audio streams, as described in greater detail herein, are typically carried over a corresponding network access path 20.

An exemplary communication device 14, such as the communication device 14A, includes a controller 22, which may include one or more central processing units and random access memory (not shown), for controlling the overall operation of the communication device 14A. The communication device 14A may also include a communications interface 24 for communications between the communication device 14A and external devices, such as the media server 12. The communication device 14A also includes, or is coupled to, a display 26 upon which a user interface (UI) 28 may be displayed and manipulated by a user, such as the participant 16A. During a conference, data generated by the communication device 14A in response to manipulations of the user interface 28 may be provided to the media server 12 via the communications interface 24. The communication device 14A also preferably includes an audio processor 30 which generates an audio stream comprising audio signals of the voice of the participant 16A, and sends the audio stream to the media server 12. The audio processor 30 also receives outgoing audio streams from the media server 12 and provides the outgoing audio streams to the participant 16A via a multi-channel capable device, such as a stereo headset 32. Those skilled in the art will recognize other multi-channel capable devices, such as stereo speakers, may also be used to provide the outgoing audio streams to the participant 16A.

Each of the communication devices 14 establishes a communication session 34, denoted by reference characters 34A-34C, respectively, with the media server 12. A communication session 34 may comprise any type of session or connection between a respective communication device 14 and the media server 12 that enables the transmission of an audio stream from the respective communication device 14 to the media server 12, and receipt of an audio stream from the media server 12 to the respective communication device 14, irrespective of the underlying physical infrastructure used to carry the audio stream, or particular protocol used to establish the communication session 34 between the respective communication device 14 and the media server 12. Suitable protocols may include, for example, TCP/IP, Session Initiation Protocol (SIP), cellular signaling and the like. A communication session 34 is typically physically implemented over a corresponding network access path 20.

The media server 12 includes a communications interface 38 that interfaces with the communication sessions 34. The communications interface 38 can comprise any suitable combination of hardware and or software necessary to receive incoming audio streams from the communication sessions 34, and send outgoing audio streams over the respective communication sessions 34. For example, the communications interface 38 could comprise line cards if a communication session 34 carries analog voice signals, or could comprise Ethernet or other packet-based circuitry if a communication session 34 carries packetized voice signals. The media server 12 may also include an interactive voice recognition (IVR) processor 40 for routing a communication session 34 to an appropriate conference.

The media server 12 also includes a conference processor 42 that establishes a multi-party audio interaction between the participants 16. The conference processor 42 receives incoming audio streams from the communication sessions 34. The incoming audio streams contain voice signals of the respective participants 16. The conference processor 42 includes a mixer 44 that mixes or combines multiple incoming audio streams to generate an outgoing audio stream. The outgoing audio stream is provided to one or more communication sessions 34 for playback on corresponding communication devices 14. The mixer 44 may generate a unique outgoing audio stream for each communication session 34. The conference processor 42 includes, or is coupled to, a three-dimensional (3D) spatial audio engine (3DSAE) 46, which receives an audio stream and aural position data, modifies the audio stream, and generates an outgoing audio stream that includes characteristics, such as phase and frequency information, that aurally positions the outgoing audio stream at an aural position indicated by the aural position data.

While for purposes of illustration the conference processor 42 is illustrated in FIG. 1 as containing the 3DSAE 46, the functionality of the 3DSAE 46 may be integral with the conference processor 42 as illustrated, or may be separate from the conference processor 42 and coupled to the conference processor 42 via a communications path. Similarly, while the mixer 44 is illustrated separately from the 3DSAE 46, the 3DSAE 46 may also have mixing capabilities in addition to, or in lieu of, mixing capabilities contained in the mixer 44. Thus, the functionality provided by the conference processor 42, the 3DSAE 46, and the mixer 44 may be implemented by the media server 12 in one or more modules, depending on desired design criteria. Thus, for purposes of illustration and brevity, functionality provided by any of the conference processor 42, the 3DSAE 46, or the mixer 44 will generally be described as being provided by the conference processor 42 hereinafter. The media server 12 also includes a controller 48 which includes a central processing unit 50 and random access memory 52, which is coupled to each of the communications interface 38, the IVR processor 40, and the conference processor 42, to control operations thereof.

The media server 12 may also include a speech recognition processor 54 for detecting commands uttered by a participant 16. The speech recognition processor 54 analyzes the incoming audio streams from the communication sessions 34 and upon detection of a command, provides the command to the controller 48.

Studies have established that an individual can more easily process multiple concurrent conversations when the conversations are spatially, or aurally, distinct from one another. For example, an individual can more easily process two concurrent conversations if one of the conversations is occurring in the front and to the left of the individual, and the other conversation is occurring to the right of the individual. Unfortunately, most multi-party audio interactions are monaural, and are perceived by the listener as originating from the same location or position. Two separate conversations in a monaural environment thus appear to be originating from the same position, and thus are extremely difficult, or impossible, to distinguish between. The present invention provides to the participant 16 upon request an outgoing audio stream that is a combination of a replay audio stream including the audio stream of a previous portion of the conference, and a real-time audio stream that includes the audio stream of the ongoing portion of the conference. The present invention aurally separates the replay audio stream from the real-time audio stream by aurally positioning the replay audio stream at a different aural position such that the participant hears the replay audio stream as originating from a different position than the real-time audio stream. In order to benefit from aurally positioned audio streams, the participant 16 uses a multi-channel capable device, such as the stereo headset 32.

Figure 2:
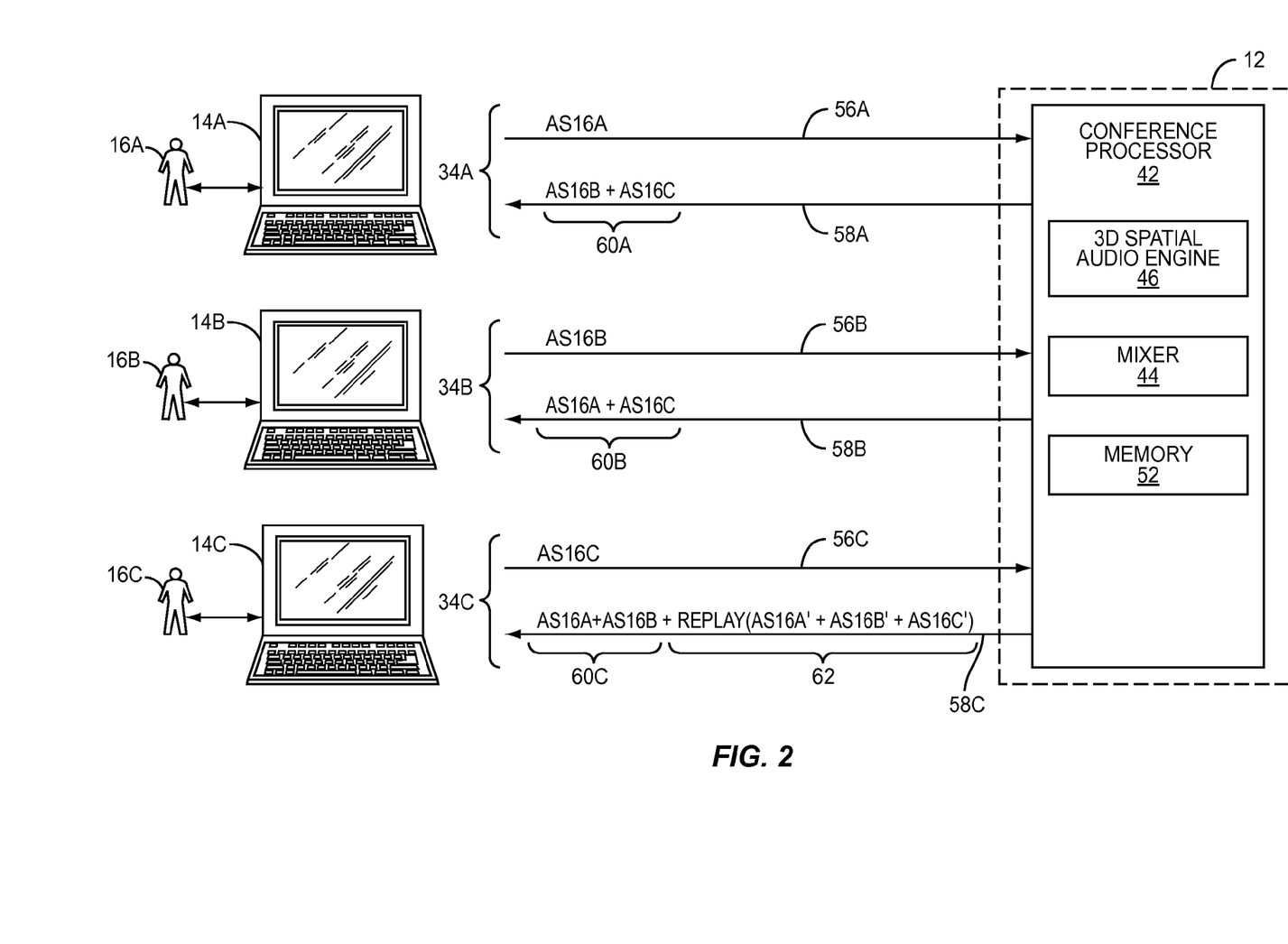
FIG. 2 is a block diagram illustrating exemplary audio streams being communicated between communication devices and a media server.

FIG. 2 is a block diagram illustrating exemplary audio streams being communicated between the communication devices 14A-14C and the media server 12. For the purposes of illustration, only the conference processor 42 and related components of the media server 12 are illustrated in FIG. 2. Moreover, the memory 52 is illustrated as being integral with the conference processor 42, but may be maintained in another module of the media server 12, such as the controller 48.

The communication device 14A provides an incoming audio stream 56A comprising the voice signals of the participant 16A to the conference processor 42. The contents of the incoming audio stream 56A are designated "AS16A" to designate that the incoming audio stream 56A comprises voice signals generated by the participant 16A. Similarly, an incoming audio stream 56B provides an audio stream of the participant 16B to the conference processor 42, and an incoming audio stream 56C provides an audio stream of the participant 16C to the conference processor 42. The conference processor 42 concurrently and continuously during the duration of the conference provides an outgoing audio stream 58A to the communication device 14A for playback to the participant 16A. The outgoing audio stream 58A comprises a real-time audio stream 60A which includes the audio signals generated by the participants 16B and 16C. The phrase real-time means that the audio stream 60A is provided to the communication device 14A substantially as the conference processor 42 receives the incoming audio streams 56B and 56C carrying the voice signals of the participants 16B and 16C, respectively. Note that the real-time audio stream 60A preferably does not include the voice signals of the participant 16A. In addition, often when the number of participants in a conference is more than three, the real-time audio stream 60A may include only the actively speaking participant 16 and the loudest participant 16 attempting to interrupt the actively speaking participant 16. Those skilled in the art will recognize there are multiple potential configurations of the real-time audio stream 60A.

In a similar manner, the conference processor 42 concurrently and continuously during the duration of the conference provides an outgoing audio stream 58B to the communication device 14B for playback to the participant 16B. The outgoing audio stream 58B comprises a real-time audio stream 60B which includes the audio signals generated by the participants 16A and 16C. Similarly, the conference processor 42 concurrently and continuously during the duration of the conference provides an outgoing audio stream 58C to the communication device 14C for playback to the participant 16C. The outgoing audio stream 58C comprises a real-time audio stream 60C which includes the audio signals generated by the participants 16A and 16B.

The conference processor 42 buffers, or stores, one or more of the incoming audio streams 56A-56C and the outgoing audio streams 58A-58C in the memory 52. The buffered audio streams maintained in the memory 52 may be audio signals associated with the entire duration of the conference, or the most recent N minutes or seconds of the conference, depending on implementation.

Assume that the participant 16C has requested that a portion of the conference be replayed. In response to the request, the conference processor 42 generates a replay audio stream 62. The replay audio stream 62 is extracted from the memory 52 and comprises a previous portion of the buffered audio streams corresponding to the requested portion of the conference. The replay audio stream 62 is illustrated in FIG. 2 as "AS16A'+AS16B'+AS16C'". The replay audio stream 62 is aurally positioned via the 3DSAE 46 at an aural position that is different from the aural position of the real-time audio stream 60C. The participant 16C listens to the outgoing audio stream 58C on a stereo headset, and the real-time audio stream 60C is perceived to be coming from a different position than the replay audio stream 62, enabling the participant 16C to listen to a previous portion of the conference, while concurrently listening to the ongoing conference. Note that the replay audio stream 62 is only provided to the participant 16C that requested the replay, so the other participants 16A, 16B will not hear the replay audio stream 62. Note further that although the real-time audio stream 60 does not typically include the voice signals of the participant 16 that is receiving the real-time audio stream 60, the replay audio stream 62 may include the voice signals of all the participants 16A-16C, including the participant 16 that is receiving the replay audio stream 62.

In another embodiment, upon receipt of a request to replay a portion of the conference, the conference processor 42 may change the aural position of the real-time audio stream 60C in addition to providing the replay audio stream 62 at a designated aural position. For example, during normal operation, the conference processor 42 may not provide any aural positioning of the real-time audio stream 60C, and thus it will be perceived by the participant 16C as originating in their head. Upon receipt of the request to replay a portion of the conference, the conference processor may aurally position the real-time audio stream 60C to position the real-time audio stream 60C at a position that is a desired distance from where the replay audio stream 62 is positioned. For example, assume that the designated aural position of the replay audio stream is in the front and at a 45 degree angle to the left of the participant 16C. The conference processor 42 may begin providing the real-time audio stream 60C to the front and at a 45 degree angle to the right of the participant 16C to increase the aural distance between the real-time audio stream 60C and the replay audio stream 62 to enhance the participant's 16C ability to distinguish between the two audio streams. In an alternate embodiment, the aural position of the real-time audio stream 60C may be user definable and stored in configuration information accessible by the media server 12.

In one embodiment, the conference processor 42 may enable the participant 16C to designate separate aural positions for the audio signals associated with the participants 16A, 16B. Thus, the audio signals of the participants 16A and 16B in the real-time audio stream 60C may be aurally positioned at different aural positions. For example, the participant 16C may hear the audio signals associated with the participant 16A to the front and left of the participant 16C and the audio signals of the participant 16B to the front and right of the participant 16C. In such embodiment, the conference processor 42 may choose a different aural position, such as directly in front of or directly behind the participant 16C, for the replay audio stream 62.

Figure 3:
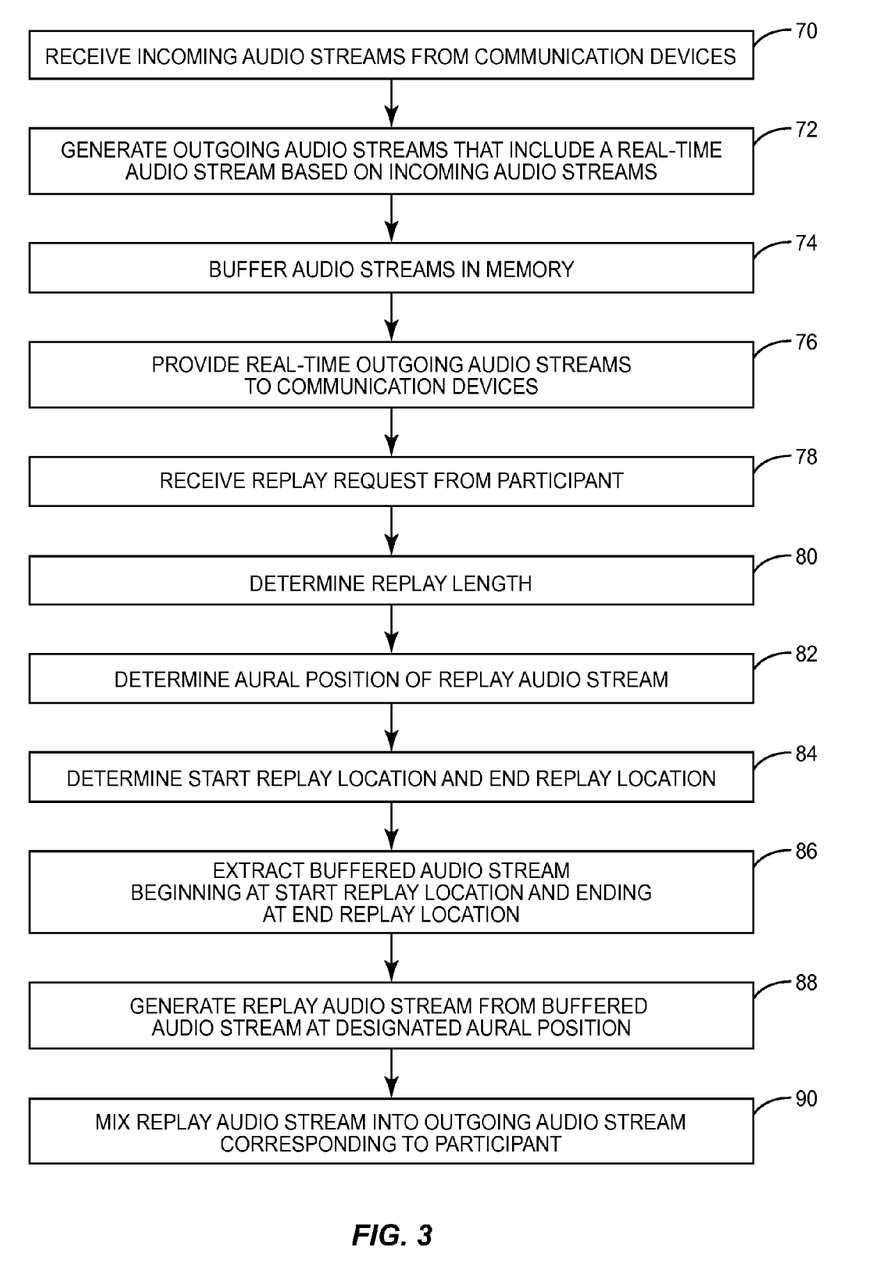
FIG. 3 is a flow chart illustrating a method for providing an outgoing audio stream that includes a real-time audio stream and a replay audio stream according to one embodiment of the invention.

FIG. 3 is a flow chart illustrating a method for providing an outgoing audio stream that includes a real-time audio stream and a replay audio stream according to one embodiment of the invention. FIG. 3 will be discussed in conjunction with FIG. 2. The conference processor 42 receives incoming audio streams 56A-56C from respective communication devices 14A-14C substantially concurrently (step 70). The conference processor 42 also generates outgoing audio streams 58A-58C that includes real-time audio streams 60A-60C, respectively, based on incoming audio streams 56A-56C (step 72). The conference processor 42 buffers one or more of the incoming audio streams 56A-56C and the outgoing audio streams 58A-58C into the memory 52 (step 74). The conference processor 42 provides the outgoing audio streams 60A-60C to respective communication devices 14A-14C for playback to respective participants 16A-16C (step 76).

The conference processor 42 receives a replay request from a participant, such as the participant 16C, to replay a portion of the conference (step 78). The conference processor 42 determines a replay length identifying a length of time of the portion of the conference to replay (step 80). The replay length may be determined in any suitable manner. For example, the replay request may include the replay length. Alternately, there may be a default replay length associated with the conference processor 42. In another embodiment, each of the participants 16A-16C may have configuration information accessible by the media server 12 that identifies a designated replay length for each of the participants 16A-16C. If the conference processor 42 includes the speech recognition processor 54, the replay length may be verbally included in the replay request command. For example, the participant 16 may trigger a conference command mode by uttering a particular sound, such as the word "commands." After triggering the conference command mode, the participant may then utter "replay 45," to indicate the participant would like to replay the previous 45 seconds of the conference. The speech recognition processor 54 detects the "command" utterance, and subsequently the "replay 45" utterance, which is provided to the conference processor 42 for processing.

The conference processor 42 determines the aural position of the replay audio stream 62 that will be provided to the participant 16 (step 82). The aural position may be determined in any suitable manner. In one embodiment, the communication device 14C may include a user interface wherein the participant 16C can position an icon with respect to a reference position to designate an aural position. The communication device 14C can calculate aural position data, such as an angle identifying the desired aural position with respect to the reference position, and a loudness value indicating a volume. Alternately, the conference processor 42 determines the aural position based on a designated default aural position of the replay audio stream 62. In another embodiment, an aural position may be determined based on configuration information of the participant 16C that is accessible to the media server 12. The format and values of the aural position data may differ depending on the 3DSAE 46.

The conference processor 42 determines a start replay location in the memory 52 and an end replay location in the memory 52 based on the replay length (step 84). The conference processor 42 extracts the buffered audio streams from the memory 52 beginning at the start replay location and ending at the end replay location (step 86). The conference processor 42, via the 3DSAE 46, generates the replay audio stream 62 at the designated aural position (step 88). The replay audio stream 62 is mixed into the outgoing audio stream 58C along with the real-time audio stream 60C being provided to the communication device 14C (step 90). In addition to aurally positioning the replay audio stream 62 at a designated aural position, other characteristics of the replay audio stream 62 could be altered to further distinguish the replay audio stream 62 from the real-time audio stream 60C. For example, the replay audio stream 62 could be provided at a faster or slower rate than normal, could be provided at a higher or lower pitch, a higher or lower volume, and the like. While for purposes of illustration the steps have been described in a particular order herein, it will be apparent to those skilled in the art that many of the steps could be performed in a different order. For example, audio streams may be buffered in the memory 52 before generating the outgoing audio streams if the outgoing audio streams are not buffered. Alternately, audio streams may be buffered in the memory 52 after generating or sending the outgoing audio streams to the corresponding audio devices.

Figure 4:
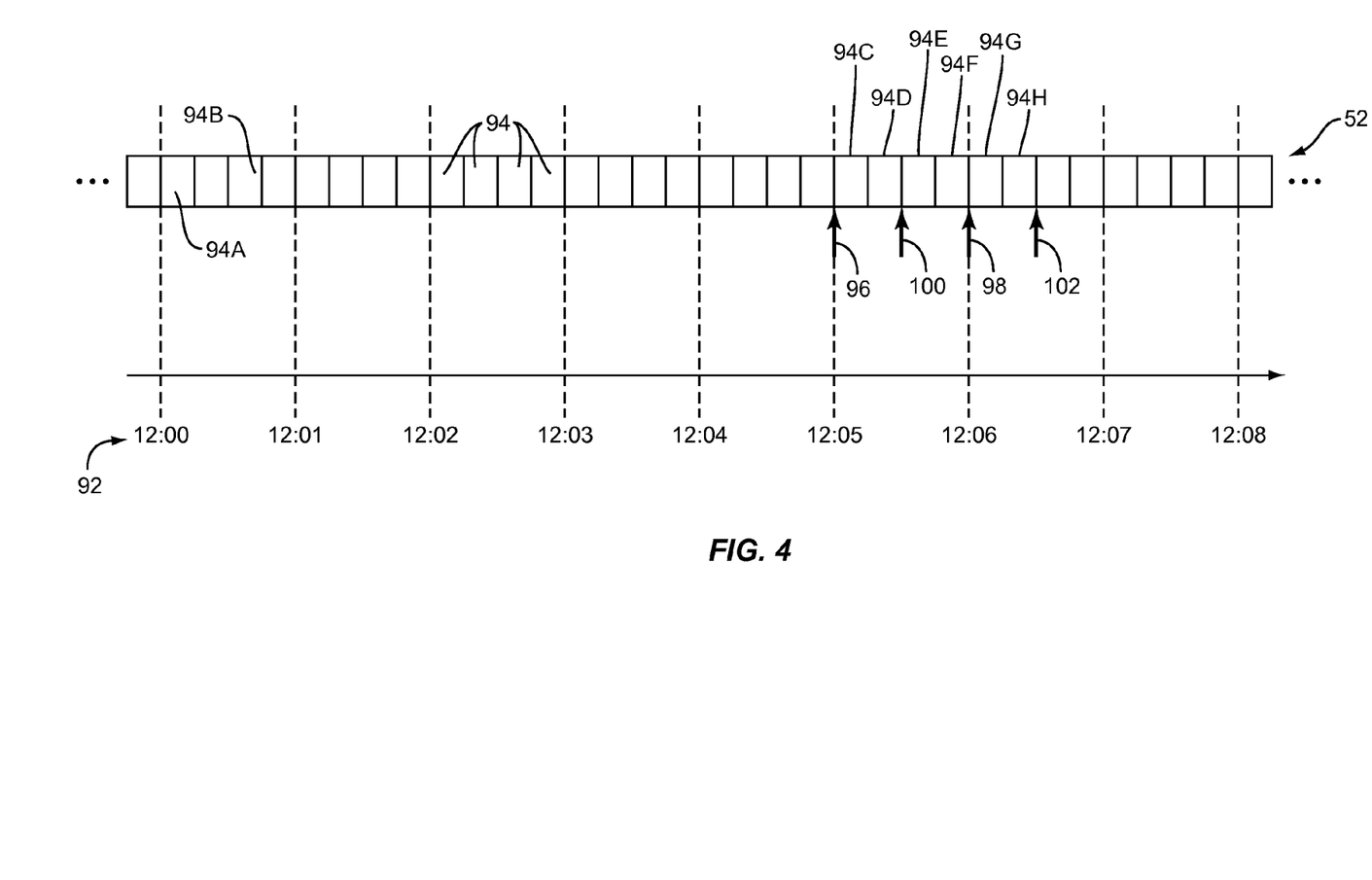
FIG. 4 is a block diagram illustrating the determination by the conference processor of begin replay locations and end replay locations for replay requests from two participants.

FIG. 4 is a block diagram illustrating the determination by the conference processor 42 of begin replay locations and end replay locations for replay requests from two participants 16. A timeline 92 is provided to illustrate a time associated with the incoming audio streams buffered in the memory 52. For purposes of illustration, the memory 52 is illustrated as comprising a plurality of memory blocks 94, each of which stores 15 seconds of buffered audio streams. For example, the memory block 94A may contain the incoming audio streams 56 that were received by the conference processor 42 between 12:00:00 and 12:00:14, and the memory block 94B may contain the incoming audio streams 56 that were received by the conference processor 42 between 12:00:29 and 12:00:44.

Assume that at 12:06 a first participant 16 requests that the conference processor 42 provide a replay of a portion of the conference, and that the replay length is 60 seconds. The conference processor 42 determines that a start replay location 96 is at 12:05:00, 60 seconds prior to receipt of the request. The conference processor 42 determines that an end replay location 98 is at 12:06:00, the time of the receipt of the request. The conference processor 42 begins providing a replay audio stream that is extracted from the memory blocks 94C-94F at a first designated aural position to the communication session 34 corresponding to the first participant. Assume that at 12:06:30 a second participant requests that the conference processor 42 provide a replay of a portion of the conference, and that the replay length is again 60 seconds. The conference processor 42 determines that a start replay location 100 is at 12:05:30, 60 seconds prior to receipt of the request. The conference processor 42 determines that the end replay location 102 is at 12:06:30, the time of the receipt of the request. The conference processor 42 begins providing a replay audio stream 62 that is extracted from the memory blocks 94E-94H at a second designated aural position to the communication session 34 corresponding to the second participant. While incoming audio streams 56A-56C were stored in the memory blocks 94 for purposes of illustration, those of skill in the art will recognize that the conference processor 42 may buffer outgoing audio streams 58A-58C generated by the conference processor 42, such as outgoing audio streams 58A-58C rather than, or in addition to, the incoming audio streams 56.

Figure 5:
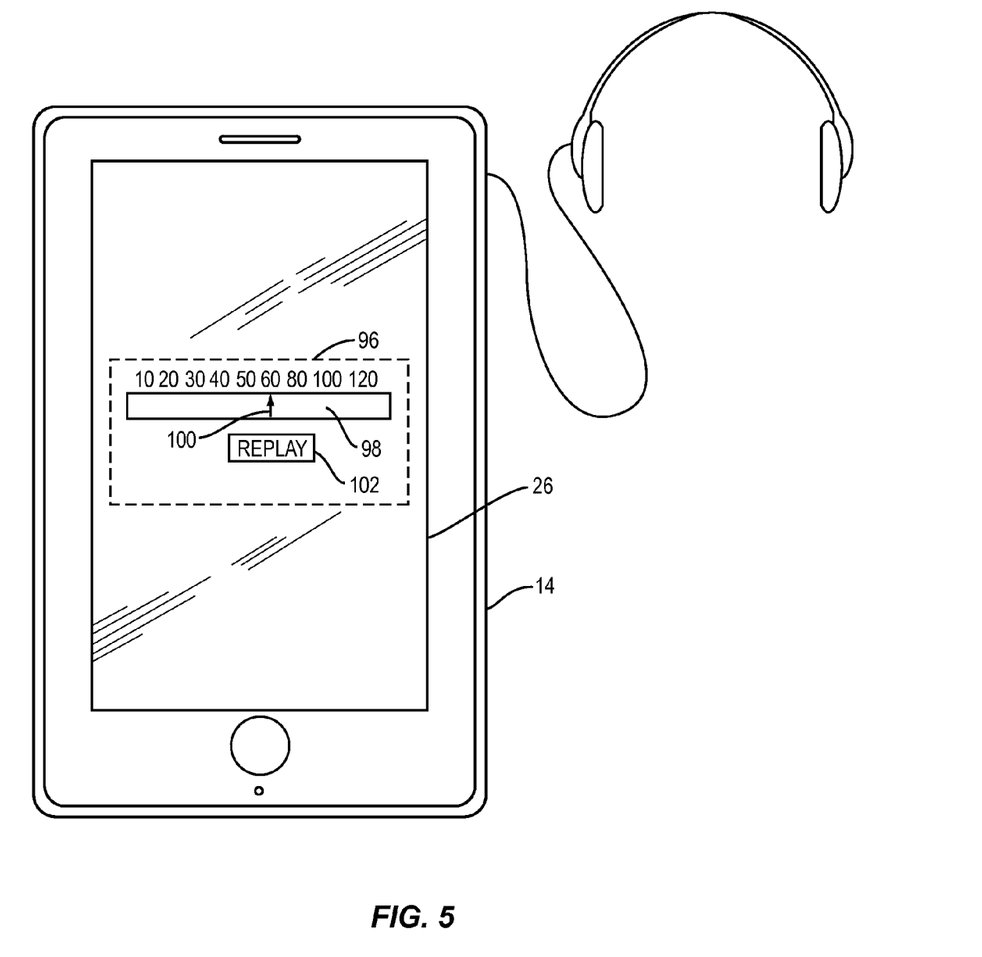
FIG. 5 is a block diagram of a communication device according to another embodiment of the invention.

FIG. 5 is a block diagram of a communication device 14 according to another embodiment of the invention. The communication device 14 may comprise a mobile communication device such as an Apple® iPhone®, for example. The communication device 14 may include a display area 96 in which a slider box 98 may be provided for display to the participant 16. The slider box 98 may include a selector 100 that is moveable by the participant 16 to indicate a replay length. As illustrated in FIG. 5, the selector 100 designates a replay length of 60 seconds.

Upon selection of a replay button 102 by the participant, the communication device 14 generates and sends to the conference processor 42 a replay request including a parameter that identifies a replay length of 60 seconds.

Various aspects of the present invention may be embodied in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer-readable storage medium known in the art. An exemplary storage medium is coupled to the CPU such that the CPU can read information from, and write information to, the storage medium. In the alternative, the storage medium may be integral to the CPU. The CPU and the storage medium may reside in an ASIC. The ASIC may reside in the media server 12, for example.

Those skilled in the art will recognize improvements and modifications to the preferred embodiments of the present invention. All such improvements and modifications are considered within the scope of the concepts disclosed herein and the claims that follow.

What is claimed is:

1. A method for replaying a portion of a multi-party audio interaction to a participant of the audio interaction, comprising:
　receiving a plurality of incoming audio streams, wherein each of the plurality of incoming audio streams corresponds to one of a plurality of participants of the multi-party audio interaction;
　generating an outgoing audio stream comprising a real-time audio stream based on one or more of the plurality of incoming audio streams;
　buffering at least one of the plurality of incoming audio streams and the outgoing audio stream in a memory;
　continuously providing the outgoing audio stream to a first communication session corresponding to a first participant of the plurality of participants;
　receiving a request from the first participant to replay a portion of the multi-party audio interaction;
　determining a replay length identifying a length of time of the portion of the multi-party audio interaction;
　retrieving the portion of the multi-party audio interaction from the memory comprising determining a start replay location in the memory based on the replay length and a finish replay location, wherein the portion of the multi-party audio interaction comprises a portion of the buffered audio streams contained in the memory between the start replay location and the finish replay location;
　modifying the portion of the multi-party audio interaction to generate a replay audio stream that is aurally positioned at a first aural position; and
　mixing the replay audio stream into the outgoing audio stream being provided to the first communication session.

2. The method of claim 1 wherein modifying the portion to generate the replay audio stream that is aurally positioned at the first aural position further comprises generating multiple channels of audio signals, wherein the audio signals in at least one of the multiple channels includes frequency and phase characteristics which position the replay audio stream at the first aural position.

3. The method of claim 1 wherein the replay length is provided as a parameter in the request.

4. The method of claim 1 wherein the replay length is maintained in a persistent memory location.

5. The method of claim 4 wherein the replay length is participant configurable.

6. The method of claim 1 further comprising modifying the real-time audio stream to aurally position the real-time audio stream at a second aural position that is different from the first aural position.

7. The method of claim 6 wherein the second aural position is participant configurable.

8. The method of claim 1 further comprising:
generating a second outgoing audio stream comprising a second real-time audio stream based on the one or more of the plurality of incoming audio streams;
continuously providing the second outgoing audio stream to a second communication session corresponding to a second participant of the plurality of participants;
receiving a second request from the second participant to replay a second portion of the conference call;
retrieving the second portion of the multi-party audio interaction from the memory;
modifying the second portion to generate a second replay audio stream that is aurally positioned at a second aural position; and
mixing the second replay audio stream into the second outgoing audio stream being provided to the second communication session concurrently while mixing the modified replay audio stream into the outgoing audio stream being provided to the first communication session.

9. The method of claim 1 wherein continuously providing the outgoing audio stream to the first communication session corresponding to the first participant comprises continuously providing the outgoing audio stream to the first communication session during a period of time that the first participant participates in the multi-party audio interaction.

10. The method of claim 1 wherein a first incoming audio stream of the plurality of incoming audio streams corresponds to the first participant, and wherein receiving the request from the first participant to replay the portion of the multi-party audio interaction comprises detecting in the first incoming audio stream a replay command spoken by the first participant.

11. An apparatus for replaying a portion of a multi-party audio interaction to a participant of the audio interaction, comprising:
a controller; and
a conference processor coupled to the controller and adapted to:
receive a plurality of incoming audio streams, wherein each of the plurality of incoming audio streams corresponds to one of a plurality of participants of the multi-party audio interaction;
generate an outgoing audio stream comprising a real-time audio stream based on one or more of the plurality of incoming audio streams;
buffer at least one of the plurality of incoming audio streams and the outgoing audio stream in a memory;
continuously provide the outgoing audio stream to a first communication session corresponding to a first participant of the plurality of participants;
receive a request from the first participant to replay a portion of the multi-party audio interaction;
determine a replay length identifying a length of time of the portion of the multi-party audio interaction;
retrieve the portion of the multi-party audio interaction from the memory, wherein retrieving the portion of the multi-party audio interaction comprises determining a start replay location in the memory based on the replay length and a finish replay location, wherein the portion of the multi-party audio interaction comprises a portion of the buffered audio streams contained in the memory between the start replay location and the finish replay location;
modify the portion of the multi-party audio interaction to generate a replay audio stream that is aurally positioned at a first aural position; and
mix the replay audio stream into the outgoing audio stream being provided to the first communication session.

12. The apparatus of claim 11 wherein the conference processor is further adapted to modify the real-time audio stream to aurally position the real-time audio stream at a second aural position that is different from the first aural position.

13. The apparatus of claim 12 wherein the second aural position is participant configurable.

14. The apparatus of claim 11 wherein the conference processor is further adapted to:
generate a second outgoing audio stream comprising a second real-time audio stream based on one or more of the plurality of incoming audio streams;
continuously provide the second outgoing audio stream to a second communication session corresponding to a second participant of the plurality of participants;
receive a second request from the second participant to replay a second portion of the multi-party audio interaction;
retrieve the second portion of the multi-party audio interaction from the memory;
modify the second portion to generate a second replay audio stream that is aurally positioned at a second aural position; and
mix the second replay audio stream into the second outgoing audio stream being provided to the second communication session concurrently while mixing the modified replay audio stream into the outgoing audio stream being provided to the first communication session.

15. The apparatus of claim 11 wherein a first incoming audio stream of the plurality of incoming audio streams corresponds to the first participant, and wherein to receive the request from the first participant to replay the portion of the multi-party audio interaction the conference processor is further adapted to detect in the first incoming audio stream a replay command spoken by the first participant.

16. The apparatus of claim 11 wherein the replay length is provided as a parameter in the request.

17. The apparatus of claim 11 wherein the replay length is maintained in a persistent memory location.

18. A computer program product, comprising a non-transitory computer usable medium having a computer readable program code embodied therein, said computer readable program code adapted to be executed to implement a method for designating an aural position of an audio stream, said method comprising:
receiving a plurality of incoming audio streams, wherein each of the plurality of incoming audio streams corresponds to one of a plurality of participants of a multi-party audio interaction;
generating an outgoing audio stream comprising a real-time audio stream based on one or more of the plurality of incoming audio streams;
buffering at least one of the plurality of incoming audio streams and the outgoing audio stream in a memory;

continuously providing the outgoing audio stream to a first communication session corresponding to a first participant of the plurality of participants;
receiving a request from the first participant to replay a portion of the multi-party audio interaction;
determining a replay length identifying a length of time of the portion of the multi-party audio interaction;
retrieving the portion of the multi-party audio interaction from the memory comprising determining a start replay location in the memory based on the replay length and a finish replay location, wherein the portion of the multi-party audio interaction comprises a portion of the buffered audio streams contained in the memory between the start replay location and the finish replay location;
modifying the portion of the multi-party audio interaction to generate a replay audio stream that is aurally positioned at a first aural position; and
mixing the replay audio stream into the outgoing audio stream being provided to the first communication session.

19. The computer program product of claim 18 wherein modifying the portion to generate the replay audio stream that is aurally positioned at the first aural position further comprises generating multiple channels of audio signals, wherein the audio signals in at least one of the multiple channels includes frequency and phase characteristics which position the replay audio stream at the first aural position.

20. The computer program product of claim 18 wherein the method further comprises:
generating a second outgoing audio stream comprising a second real-time audio stream based on one or more of the plurality of incoming audio streams;
continuously providing the second outgoing audio stream to a second communication session corresponding to a second participant of the plurality of participants;
receiving a second request from the second participant to replay a second portion of the multi-party audio interaction;
retrieving the second portion of the multi-party audio interaction from the memory;
modifying the second portion to generate a second replay audio stream that is aurally positioned at a second aural position; and
mixing the second replay audio stream into the second outgoing audio stream being provided to the second communication session concurrently while mixing the modified replay audio stream into the outgoing audio stream being provided to the first communication session.

21. The computer program product of claim 18 wherein the replay length is provided as a parameter in the request.

22. The computer program product of claim 18 wherein the replay length is maintained in a persistent memory location.

* * * * *